No. 780,550. PATENTED JAN. 24, 1905.
E. R. CARICHOFF.
ELECTROPNEUMATIC CONTROL SYSTEM.
APPLICATION FILED JUNE 30, 1904.
2 SHEETS—SHEET 1.
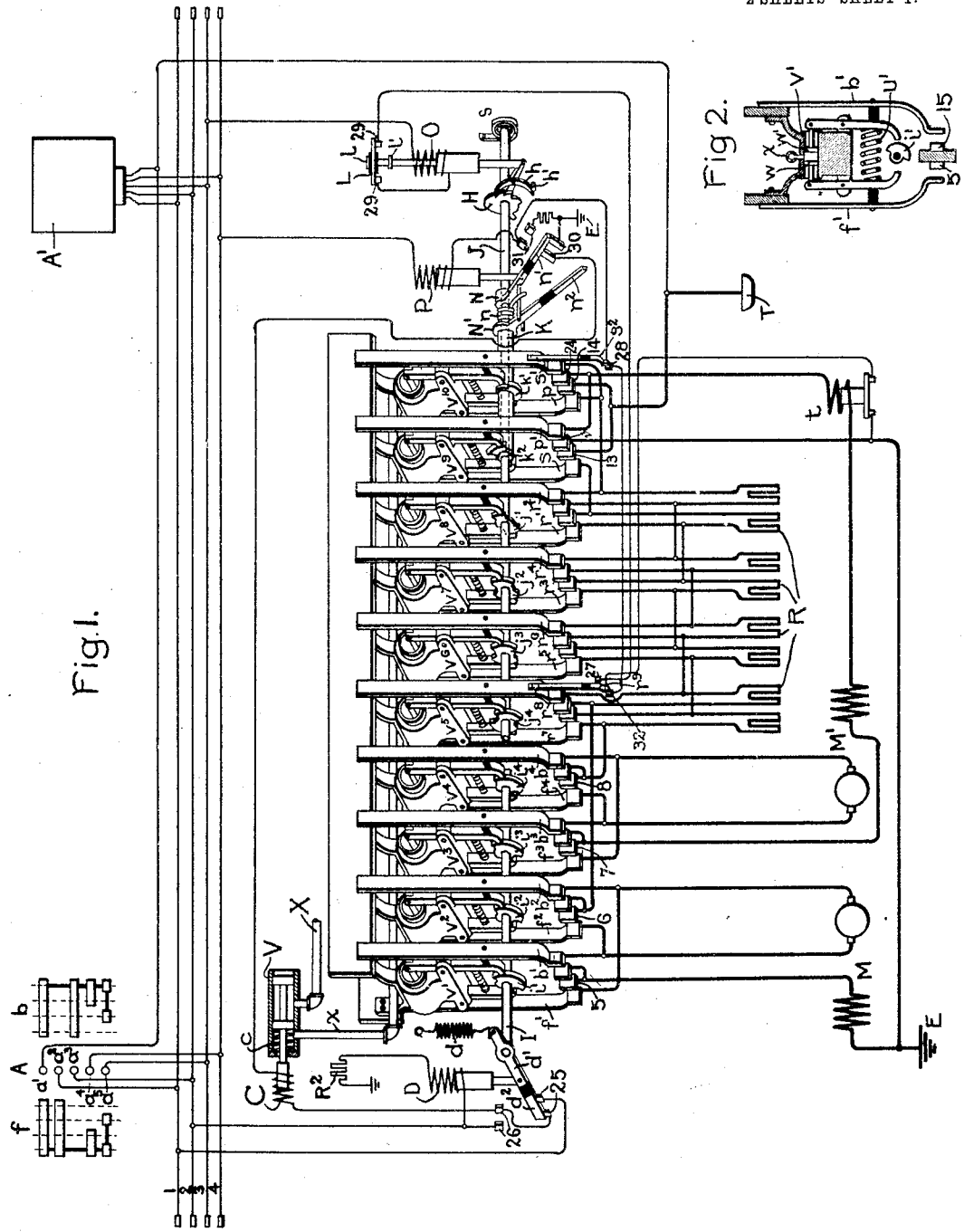
Witnesses.
Inventor:
Eugene R. Carichoff
by Albert G. Davis
Att'y.

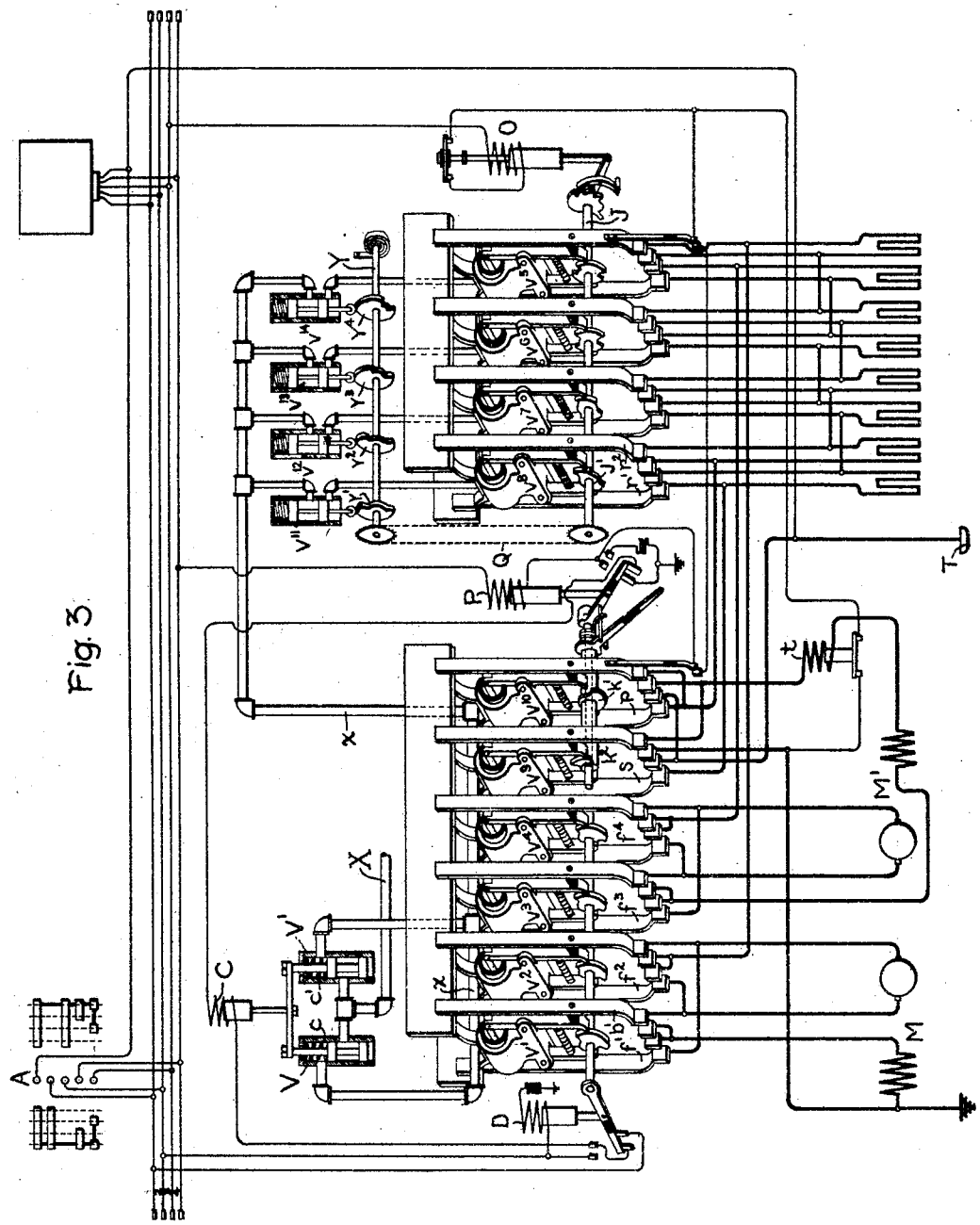

No. 780,550. Patented January 24, 1905.

UNITED STATES PATENT OFFICE.

EUGENE R. CARICHOFF, OF EAST ORANGE, NEW JERSEY, ASSIGNOR TO GENERAL ELECTRIC COMPANY, A CORPORATION OF NEW YORK.

ELECTROPNEUMATIC CONTROL SYSTEM.

SPECIFICATION forming part of Letters Patent No. 780,550, dated January 24, 1905.

Application filed June 30, 1904. Serial No. 214,695.

*To all whom it may concern:*

Be it known that I, EUGENE R. CARICHOFF, a citizen of the United States, residing at East Orange, in the county of Essex and State of New Jersey, have invented certain new and useful Improvements in Electropneumatic Control Systems, of which the following is a specification.

My invention relates to systems of control for translating devices, and is particularly adapted for use in controlling motors on electrically-propelled vehicles.

In an application for Letters Patent, Serial No. 179,796, filed by me November 4, 1903, I disclosed a system of control embodying as one of its features a controller arranged to connect and combine in any predetermined order the translating device to be controlled in such manner that all possibility of injury to the translating device due to a too-rapid increase of current is eliminated. I showed my invention as applied to an automatically-accelerating motor-control system. The automatic controlling-switch disclosed consists of a plurality of normally open switches with means for placing them simultaneously under strain, tending to cause them to close, together with means for obstructing the closing of certain switches and means for serially removing the obstructing devices, so as to permit the closing of the switches in a predetermined order. The arrangement for obtaining this end, described in my former application, consists of a plurality of switches flexibly mounted on a shaft, with electromagnetic means for rotating the shaft, so as to place the switches under strain.

My present invention consists in an improvement in the arrangement of my former application and in one aspect consists of a novel form of controller in which the electromagnetically-controlled shaft and the flexible connections of the switches are supplanted by pneumatic actuating means for the switches, together with a single valve for controlling the pneumatic actuating means.

My invention further consists in the arrangement of the switches, actuating means, and obstructing devices whereby a compact and efficient switch is produced.

In another aspect my invention consists in the combination, with translating devices, of a plurality of switches arranged to produce definite changes in the circuits of the translating devices, together with pneumatically-actuated means for placing all the switches under strain, tending to close them, and selective controlling means whereby the switches are permitted to close in a predetermined order.

More specifically considered, my invention consists in the combination, with a plurality of motors and resistances therefor, of a plurality of normally open switches adapted and arranged to connect the motors in series and in parallel, to vary the amount of resistance included in the motor-circuits, and to connect the motors for forward and reverse rotation, together with pneumatic actuating means arranged to place all the switches under strain and selective controlling means whereby the switches are permitted to close, so as to connect the motors in series for either direction of rotation with all the resistances in circuit, then to cut out the resistance, then to connect the motors in parallel with all the resistances in circuit, and then to cut out the resistances.

In another aspect my invention consists of a multiple-unit train-control system in which each unit comprises several switches for making the desired connections of the motor-circuits, pneumatically-controlled actuating means for the several switches, a valve for controlling the actuating means, selective devices governing the action of the actuating means, and a master-controller governing the valve for the actuating means and the selective devices of all the units.

My invention will best be understood by reference to the accompanying drawings, in which—

Figure 1 shows a motor-control system arranged in accordance with my invention. Fig. 2 shows a detail of the pneumatic actuating means for a pair of switches, and Fig. 3 shows a modified arrangement of the control system.

In the drawings, V represents a valve controlling the actuating means for the switches. The valve V, which is controlled by the coil C, is normally held in the position shown by the spring $c$. This valve comprises two pistons, forming a balance-valve disposed on opposite sides of the connection X to a source of fluid-pressure. A second connection $x$, extending to the pneumatic actuating means for the several switches, is normally connected to atmosphere when the valve is in the position shown. When the coil C is energized, drawing the valve V toward the left, the connection between the pipe $x$ and atmosphere is broken and a connection is established between the pipes X and $x$, thereby connecting the pneumatic actuating means for the switches to the source of fluid-pressure. The actuating means for the several switches are indicated by the devices $v'$ to $v^{10}$, each of which controls a pair of normally open switches. The construction of the devices is clearly shown in Fig. 2. The device $v'$ comprises two pistons $w$, placed back to back on opposite sides of the connection $x$. When the pipe $x$ is connected to the source of fluid-pressure, the pistons are pressed outwardly, drawing the switches $f'$ and $b'$ inwardly, tending to bring them into engagement with the contacts 5 and 15, respectively. $i'$ represents an obstructing device which in the position shown permits the closing of switch $f'$ and obstructs the closing of switch $b'$. By the rotation of the obstructing device or cam $i'$ switch $f'$ may be prevented from closing and switch $b'$ allowed to close. The switches are normally held open by the spring $u'$.

Referring again to Fig. 1, M M' represent two motors the circuits of which are controlled by the normally open switches operated by the pneumatic actuating means. The motor-circuits are shown in heavy lines and the control-circuits in light lines. The switches in the motor-circuit may be divided into three sets. One set comprises eight figures, (indicated by $f'$ to $f^4$ and $b'$ to $b^4$.) This set is adapted and arranged to connect the motors for forward and backward rotation. A second set consists of four switches $s\ s'$ and $p\ p'$. These switches are arranged for connecting the motors in series or in parallel. The third set comprises eight switches $r'$ to $r^8$. These switches control the amount of resistance R in the motor-circuit. When the coil C is energized, moving valve V to the left and connecting the actuating means to the source of fluid-pressure, all these switches are placed under strain tending to close them; but certain of the switches of each set are prevented from closing by the obstructing devices of that set.

The obstructing devices for the first set of switches for forward and reverse rotation consist of the four cams $i'$ to $i^4$, mounted on the shaft I and controlled by the magnet-winding D. This magnet-winding consequently controls the direction of rotation of the motors and will be hereinafter designated as the "director-coil." The second set of switches $r'$ to $r^8$ for controlling the amount of resistance in the motor-circuits is obstructed by the cams $j'$ to $j^4$, mounted on the shaft J, which is controlled by the magnet-winding O. This magnet-winding consequently controls the amount of resistance in the motor-circuits and will be hereinafter designated as the "repeater-coil" for reasons that will hereinafter be seen. The third set of switches $s\ s'$ and $p\ p'$ is obstructed by the cams $k'$ and $k^2$, carried by sleeve K, which is mounted on the shaft J. The sleeve K is controlled, as will be hereinafter described, by the coil P. This coil, which acts to connect the motors in parallel, will be hereinafter designated as the "paralleler-coil."

The coils C, D, O, and P are connected to the train-wires 1, 2, 3, and 4. These are shown in Fig. 1 provided with couplings at either end, it being understood that the figure shows the arrangement for a single unit of a train-control system, the arrangement being duplicated for each car of the train. A A' represent two master-controllers, the controller A being shown with its contact developed on a plane surface. Two sets of movable contacts are shown for forward and reverse rotation, (indicated by the letters $f$ and $b$.) The master-controller is shown with four positions each for forward and backward rotation, (indicated by the four dotted lines for each set of movable contacts.) The control-circuits, which, as has been said heretofore, are indicated in light lines, comprise the master-controller, the actuating-coils C, D, P, and O, and the train-wires.

Considering the arrangement of the magnetically-operated controlling devices more specifically, it will be seen that the core of director-coil D is connected to the shaft I through the lever $d'$. A tension-spring $d$ is connected to the lever $d'$ and holds shaft I in the position shown as long as director-coil D is not energized. This position of the shaft and its obstructing devices corresponds to the forward direction of rotation, as will be hereinafter seen. The lever $d'$ carries the bridging member $d^2$, arranged to engage the contacts 25 or 26, according to its position. These contacts form an interlock between the director-coil D and the valve-controlling coil C, as will be hereinafter explained.

The movement of shaft J is controlled by the repeater-coil O by means of a toothed wheel H, mounted on the shaft, and a pawl $h$, actuated by the core of coil O. The pawl $h$ is provided with a pin $h'$, which lifts the pawl $h$ out of engagement with the toothed wheel, when coil O is deënergized and the core falls to the position shown. The core of coil O also carries two collars $l$ and $l'$, which engage the bridging member L when the core of coil O is raised and lowered. The bridging member L, which is in engagement with contacts 29 when the coil O is deënergized, is lifted out of engagement with these contacts by the collar $l'$ when coil O is energized to lift its core. This raising of the bridging member L opens the circuit of coil O at contacts 29 and results in a deënergizing of coil O, allowing its core to fall, so as to bring collar $l$ into engagement with bridging member L to restore the bridging member L into engagement with the contacts 29. The circuit of coil O is thus made and broken, so as to produce a reciprocating movement of its core, which results in a notching up of shaft J by means of the toothed wheel H and the pawl $h$. Shaft J is thus rotated step by step by the repetition of this action, and it is for this reason that I have designated the coil O as the "repeater-coil."

The core of the coil P is connected to the lever N, which is connected to the lever N′ on the sleeve K by means of the spiral tension-spring $n$. The lever N carries the bridging member $n'$, which engages the contacts 30 or 31, according to the position of lever N. The lever N′ carries the bridging member $n^2$, which engages the contacts 30 when the sleeve K is rotated.

$t$ represents a throttle connected in series with the motors and arranged to break the circuit of the repeater-coil O and to prevent further removal of resistance whenever the current in the motor-circuit reaches a predetermined amount.

The operation is then as follows: When the master-controller A is moved to its first position for forward rotation, the following circuit is completed: from trolley T to motor-controller contact $a'$, to contact $a^2$, contacts 25, bridging member $d^2$, coil C, contacts 30 and bridging member $n'$, to earth E. A circuit is thus completed through the actuating-coil C of the valve V. The valve V is drawn to the left, connecting the pneumatic actuating means for the switches to the source of fluid-pressure, and thereby placing all the switches under strain tending to move them to closed position. By noting the position of the several obstructing devices it will be seen that the following switches are permitted to close: switches $f'$ to $f^4$ and switches $s$ to $s'$. The motor-circuit is then completed as follows: from trolley T to contact 13, through one half of the resistance-sections R, to contact 8, switch $f^4$, to armature of motor M′, to switch $f^3$, contact 7, field of motor M′, throttle $t$, contact 24, switch $s'$, through the remaining resistance-sections R, contact 6, switch $f^2$, armature of motor M, switch $f'$, contact 5, field of motor M, to earth. The two motors are thus placed in series with all the resistances in circuit. These connections continue as long as the master-controller is maintained in its first position. When the master-controller is moved to its second forward position, another circuit is completed as follows: from trolley T to contact $a'$ of the master-controller, contact $a^5$, train-wire 3, repeater-coil O, contacts 29 and bridging member L, contact 27, switch $r^9$, through the contacts controlled by throttle $t$, to earth. The repeater-coil is thus energized and begins the notching up of shaft J in the manner that has been heretofore explained. The first step results in removing the obstructing devices from switches $r'$ and $r^2$. These switches are thus allowed to close with a snap action, short-circuiting two resistance-sections R. The second step results in the closing of switches $r^3$ and $r^4$ and the cutting out of two more resistance-sections. This continues until all the resistance-sections are cut out. If the removal of the resistance occurs too fast, the throttle $t$ will open the circuit of repeater-coil O and prevent further removal of resistance until the current in the motor-circuit falls below a predetermined value. Other means for retarding the action of the repeater-coil may be used instead of or in addition to the throttle, if desired. When the last switches $r^7$ and $r^8$ are closed, all the resistances are cut out and the motors are in full series position. When this position is reached, the circuit of repeater-coil O is broken by switch $r^9$, which is carried by switch $r^8$, leaving the contact 27, and consequently further rotation of the shaft J is prevented. The shaft J is held in this position against the tension of spring S, which has been wound up by the rotation of shaft J by the engagement of the switches $r^7$ and $r^8$ with the obstructing-cam $j^4$. The above circuit connections consequently remain unchanged as long as the master-controller is in the second position. When master-controller A is moved to its third forward position, the circuit of repeater-coil O is broken at contact $a^5$ on the controller and another circuit is established as follows: from trolley T to contact $a'$ of the master-controller, contact $a^4$, train-wire 4, paralleler-coil P, switch $s^2$, contact 28, switch $r^9$, contact 32, contacts of throttle $t$, to earth E. The circuit of paralleler-coil P is thus closed, and bridging member $n'$ is moved into engagement with contacts 31, closing a maintaining-circuit for the paralleler-coil. This operation cannot occur, however, unless switch $s'$ and $r^8$ are both closed, bringing the switches $s^2$ and $r^9$, respectively, into engagement with their contacts. In other words, the paralleler-coil cannot be energized except when the motors are connected in full series position. Although the arm N has been raised by the core of paralleler-coil P, the arm N′ is not free to follow, since the obstructing devices $k'$ and $k^2$ are engaged by the switches $s'$ and $s$, respectively. The tension-spring $n$ is thus put under strain. The movement of bridging member $n'$, however, out of engagement with contacts 30 results in breaking the circuit of the valve-controlling coil C, which results in disconnecting the switch-actuating devices from the source of pressure and connecting them to atmosphere, thereby allowing the springs $u'$, &c., to restore all the switches to open position. This movement of the switches results in releasing sleeve K from switches $s$ and $s'$ and allowing the arm N' to move upward under the tension of spring $n$, so as to bring the bridging member $n^2$ into engagement with contacts 30. The obstructing devices on shaft J are also released from the resistance-controlling switches, and shaft J is allowed to return to its off position by means of spring S. The motor-circuits are also momentarily open. As soon as the switches are opened, however, and sleeve K is released the circuit of valve-controlling coil C is again closed by bridging member $n^2$ and contacts 30. All the switches are again placed under strain, as before, and switches $f'$ to $f^4$ close again. Switch $s'$, however, is prevented from closing by the obstructing device $h'$, while, on the other hand, switches $p$ and $p'$ are free to close. The motor-circuits are then completed as follows: from trolley T to contacts 13 and 14. Here the current divides, part passing through the switches $s$, half of resistance-section R, contact 8, switch $f^4$, armature of motor M', switch $f^3$, contact 7, field of motor M', throttle $t$, switch $p'$, contact 23 to earth. The other part passes to switch $p$ through the other half of resistance R to contact 6, switch $f^2$, armature of motor M, switch $f'$, contact 5, field of motor M to earth. The two motors are thus connected in parallel with half the resistance-sections in series with each motor. This connection continues as long as the master control-switch is maintained in its third position. When the master-controller is moved to its fourth forward position, the circuit of repeater-coil O is again closed, shaft J is rotated step by step, and the resistance-sections are cut out gradually in the manner heretofore explained. Finally, when all the sections are cut out the motors are connected in full parallel position, and the circuit of repeater-coil O is broken by switch $r^9$ leaving contact 27. The connections for reverse rotation differ from those for forward rotation only in the closing of switches $b'$ to $b^4$ instead of switches $f'$ to $f^4$. This is accomplished as follows: When the master controller-switch is moved to its first backward position, a circuit is closed from trolley T, contact $a'$, contact $a^3$, train-wire 2, director-coil D, resistance $R^2$ to earth. The core of director-coil D is consequently drawn up, straining the tension-spring $d$ and rotating shaft I, so as to remove the obstructing devices $i'$ to $i^4$ out of the way of switches $b'$ to $b^4$ and placing them in the way of switches $f'$ and $f^4$. This movement of the core of director-coil D brings bridging member $d^2$ into engagement with contact 26, thereby shifting the connection of valve-controlling coil C from train-wire 1 to train-wire 2. It is only by this change of connection that coil C can be energized with the master-controller in the reverse position, and this change in connections cannot be made unless switches $f'$ to $f^4$ are open, and consequently out of engagement with cam 3 $i'$ to $i^3$. The opening of these switches means that the motor-circuits are open. In this manner an interlock is provided between the reversing-switches and the resistance-controlling and series-parallel switches. As soon as the core of coil D reaches its raised position the circuit of valve-controlling coil C is again closed by means of bridging member $d^2$ and contact 26. As the master-controller is moved to its other reverse position the same changes are produced in the motor-circuits as have been heretofore described.

If at any time while repeater-coil O is at work cutting out resistance it is desired to stop this operation, it can be done simply by moving the master-controller from position 2 to position 1 or from position 4 to position 3. This opens the circuit of the repeater-coil and prevents further removal of resistances without interrupting the motor-circuit.

In the arrangement of Fig. 1 it will be seen that the rotation of shaft J by repeater-coil O is opposed by the friction of the several switches $r'$ to $r^8$ upon the obstructing cams. This requires a certain amount of power and also results in wear on the cams and switches. In order to avoid this, the arrangement of Fig. 3 may be employed. This arrangement differs from that of Fig. 1 chiefly in the fact that the actuating devices $v^5$ to $v^8$ for the resistance-controlling switches are not connected directly to pipe $x$, but are connected through the relays $v^{11}$ to $v^{14}$. These relays serve to connect the actuating devices for the resistance-controlling switches to the source of fluid-pressure only during the time that this pressure is required in the actuating devices. It will be seen that the several valves represented by $v^{11}$ to $v^{14}$ are pressed down by springs, but are normally held up in the position shown by the cams $y'$ to $y^4$ on the shaft Y. When held in the raised position by the cams, the connections from pipe $x$ to the actuating devices $v^5$ to $v^8$ are broken. Shaft Y is connected to the shaft J by the sprocket-chain Q or other suitable means, so that at the instant that the obstructing cam $j'$ has reached the position for releasing switches $r'$ and $r^2$ the cam $y'$ is in the position for releasing the valve $v^{11}$, so as to connect the actuating device $v^5$ to the pipe $x$, which results in closing the switches $r'$ and $r^2$. Thus the shaft J is relieved from the frictional retardation due to pressure on the cam $j'$ to $j^4$, the friction due to the spring-pressure of valves $v^{11}$ to $v^{14}$ being substituted therefor. This pressure may be made much less than would be required for properly closing the resistance-controlling switches and may be reduced to a minimum by means of the rollers shown. The cams $j'$ to $j^4$ may be omitted in this latter arrangement; but I prefer to retain them in order to give a snap action to the switches. This snap action is obtained by connecting the actuating devices to the source of compressed fluid just before the switches are released by the cam. The cam holds the switch while the pressure is rising on the actuating-piston, and when the switch is released it has the full pressure of the source to give it a snap action. The other points of difference in the arrangement of Fig. 3 from that of Fig. 1 consist merely in the change in the relative positions of the switches and in the employment of two valves V V' in place of the single controlling-valve of Fig. 1.

Many other modifications may be made in the construction and arrangement of parts without departing from the spirit of my invention, and I aim in the appended claims to cover all such modifications.

What I claim as new, and desire to secure by Letters Patent of the United States, is—

1. In combination, a plurality of normally open switches, pneumatically-actuated devices adapted to close said switches, a valve controlling said devices, and means for selectively obstructing the closing of said switches.

2. In combination, a plurality of normally open switches, pneumatically-actuated devices adapted to close said switches, a valve arranged to admit air simultaneously to said devices, and means for selectively obstructing the closing of said switches.

3. In combination, a plurality of normally open switches, pressure-operated pistons operatively connected to said switches, a valve arranged to admit pressure simultaneously to said pistons to cause them to press said switches toward their closed positions, and means for selectively obstructing the closing of said switches.

4. In combination, a plurality of normally open switches, pressure-operated pistons operatively connected to said switches, a valve arranged to connect said pistons to a source of pressure to cause them to press said switches toward their closed position and to atmosphere to cause them to release said switches, means for obstructing the closing of a portion of said switches, and means for controlling said obstructing means.

5. In combination, a plurality of normally open switches, pneumatically-operated means for simultaneously placing said switches under strain tending to cause them to close, and means for controlling the closing of said switches.

6. In combination, a plurality of normally open switches, pneumatically-operated means for simultaneously placing said switches under strain tending to cause them to close, means for obstructing the closing of a portion of said switches, and means for controlling both the straining and the obstructing means.

7. In combination, a plurality of normally open switches, pressure-operated means for placing said switches under strain tending to cause them to close, a valve controlling said means, electroresponsive means controlling said valve, means for obstructing the closing of a portion of said switches, electroresponsive means controlling said obstructing means, and a switch controlling both of said electroresponsive means.

8. In a motor-starting device, a motor, a resistance, a plurality of normally open switches adapted to control the amount of resistance in the motor-circuit, pressure-operated devices adapted to put said switches under strain tending to cause them to close, means for obstructing the closing of a portion of said switches, and means for serially removing the obstructing means so as to permit the successive closing of said switches.

9. In a motor-starting device, a motor, a resistance, a plurality of normally open switches adapted to control the amount of resistance in the motor-circuit, pressure-operated pistons operatively connected to said switches, a valve controlling the admission of pressure to said pistons to cause them to press said switches toward their closed positions, and means for controlling the closing of said switches.

10. In a system of control, a plurality of translating devices, a series-paralleling device comprising a plurality of normally open switches, pneumatically-operated means for placing all of said switches under strain tending to cause them to close, and means for selectively obstructing the closing of said switches.

11. In combination with an electric motor, a reversing-switch comprising a plurality of normally open switches, pneumatically-operated means for placing all of said switches under strain tending to cause them to close, and means for selectively obstructing the closing of said switches.

12. In a system of train control, a plurality of motors, resistances, reversing-switches, series-parallel switches, resistance-controlling switches, each of said switches comprising a plurality of normally open switches, pneumatically-operated means for placing said switches under strain tending to cause them to close, a valve controlling said means, a magnet-winding controlling said valve, obstructing devices for preventing the closing of a portion of said switches, magnet-windings controlling said devices, and a master-switch controlling all of said magnet-windings.

13. In a system of train control, a plurality of motors, a plurality of normally open circuit-controlling switches therefor, pneumatically-operated means for placing said switches under strain tending to cause them to close, and means controllable from a distance for selectively obstructing the closing of said switches.

14. In a system of train control, a plurality of motors, a plurality of normally open circuit-controlling switches therefor, pressure-operated pistons operatively connected to said switches, means controllable from a distance for admitting pressure to said pistons to cause them to press said switches toward their closed positions, and means controllable from a distance for selectively obstructing the closing of said switches.

15. In combination, a pair of pistons disposed back to back, connections from the space between said pistons to source of fluid-pressure, and a switch operatively connected to each piston.

16. In combination, a pair of pistons disposed back to back, means for admitting fluid-pressure to the space between said pistons to cause them to move outwardly, and a normally open switch operatively connected to each piston and arranged to be closed by its outward movement.

17. In combination, a pair of pistons disposed back to back, means for admitting fluid-pressure to said pistons to cause them to move outwardly, a pair of switches connected to said pistons and arranged to be closed by said outward movement, and a spring connecting said pistons and adapted to move said pistons inwardly and to open said switches when said fluid-pressure is removed.

18. In combination, a pair of pistons disposed back to back, connections from the space between said pistons to a source of fluid-pressure, pivoted levers connected to said pistons, a spring connecting said levers, and switches operatively connected to said levers.

19. In combination, a pair of normally open switches, a pressure-operated device disposed between said switches, and adapted to press said switches toward each other, and an obstructing device disposed between said switches.

20. In combination, a plurality of normally open switches, means for serially placing said switches under strain tending to cause them to close, and means for obstructing the closing of each switch while said strain is being applied whereby the switches are caused to close successively with a snap action.

21. In combination, a plurality of normally open switches, pneumatically-operated devices adapted to move said switches to closed position, valves controlling said devices, means for serially actuating said valves to connect said devices to a source of pressure, and means for obstructing the movement of each switch while the pressure is being applied whereby said switches are caused to close successively with a snap action.

In witness whereof I have hereunto set my hand this 28th day of June, 1904.

EUGENE R. CARICHOFF.

Witnesses:
E. S. MORGAN,
L. C. FOSS.